(12) United States Patent
Froese et al.

(10) Patent No.: US 10,807,792 B2
(45) Date of Patent: Oct. 20, 2020

(54) SYSTEM FOR CONNECTION CONTINUITY FOR COMPRESSION RING IN BOLT TOGETHER SILO

(71) Applicant: Meridian Manufacturing, Inc., Winnipeg (CA)

(72) Inventors: Andrew Froese, Winkler (CA); Jason Fehr, Ottosen, IA (US); Aaron Dyck, Stephenfield (CA); Benjamin Penner, Schanzenfeld (CA)

(73) Assignee: Meridian Manufacturing, Inc., Winnipeg (CA)

( * ) Notice: Subject to any disclaimer, the term of this patent is extended or adjusted under 35 U.S.C. 154(b) by 20 days.

(21) Appl. No.: 16/156,359

(22) Filed: Oct. 10, 2018

(65) Prior Publication Data

US 2020/0115150 A1 Apr. 16, 2020

(51) Int. Cl.
   *B65D 88/08* (2006.01)
   *B65D 88/26* (2006.01)
   *E04H 7/30* (2006.01)

(52) U.S. Cl.
   CPC ............ *B65D 88/08* (2013.01); *B65D 88/26* (2013.01); *E04H 7/30* (2013.01)

(58) Field of Classification Search
   CPC ............ B65D 88/08; B65D 88/26; E04H 7/30
   See application file for complete search history.

(56) References Cited

U.S. PATENT DOCUMENTS

| | | | |
|---|---|---|---|
| 3,479,748 A * | 11/1969 | Sietmann | F26B 9/063 34/498 |
| 4,040,218 A | 8/1977 | Stanelle | |
| 4,589,332 A * | 5/1986 | Brockhaus | B65D 88/28 454/182 |
| 5,020,246 A * | 6/1991 | Rust | F26B 25/002 34/236 |
| 5,860,221 A * | 1/1999 | Morrison | B65D 88/28 34/167 |
| 6,282,863 B1 * | 9/2001 | Christian | E04H 7/06 52/747.1 |
| 2003/0234256 A1 * | 12/2003 | Epp | E04H 7/30 220/622 |
| 2005/0091824 A1 * | 5/2005 | Epp | E04H 7/30 29/462 |
| 2005/0229501 A1 * | 10/2005 | Grossman | B65D 88/08 52/79.9 |
| 2008/0277423 A1 * | 11/2008 | Garton | B29C 41/06 222/185.1 |

(Continued)

*Primary Examiner* — Saul Rodriguez
*Assistant Examiner* — Ashley K Romano
(74) *Attorney, Agent, or Firm* — McKee, Voorhees & Sease, PLC

(57) ABSTRACT

A bulk storage bin is provided for grain and particulate material and includes a hopper bottom formed by a plurality of trapezoidal panels, each having upper and lower edges and opposite side edges. Flanges extend outwardly along each edge of each panel to provide a bolted flanged joint for adjacent panels. Plate assemblies extend along the upper edge of each panel to form a continuous 360° compression ring when the panels are assembled. Each flange has a portion extending behind the plate assemblies, with interior bolt holes. An access hole is provided at each end of each plate assembly for access to the interior bolt holes.

20 Claims, 4 Drawing Sheets

(56) References Cited

U.S. PATENT DOCUMENTS

2012/0193357 A1\* 8/2012 Pleima ................ A01F 25/2018
                                                    220/200
2018/0179775 A1\* 6/2018 Poppen .................. B65D 88/08
2019/0119038 A1\* 4/2019 Kornelsen ............ B65D 88/027

\* cited by examiner

SYSTEM FOR CONNECTION CONTINUITY FOR COMPRESSION RING IN BOLT TOGETHER SILO

FIELD OF THE INVENTION

The invention is directed toward particulate material storage bins, such as grain silos. More particularly, the invention relates to a compression ring for strengthening the bin or silo, while maintaining a smooth interior surface.

BACKGROUND OF THE INVENTION

Bins and silos used for storage of grain and other particulate material typically have a cylindrical side wall, a roof with an inlet for introducing the material, and a tapered bottom with an outlet for discharge of the material. The bins typically are assembled from numerous panels bolted together. One problem with the prior art bins is that the bolts extend into the interior of the bin, thus requiring a person on the inside for assembly. Also, it is desirable that the interior of these bulk product storage bins have a smooth interior, which is not possible with the current bolt together designs. Current bin construction also limits the size of the bins and the weight of the bulk products inside the bins. Also, the use of many small pieces in the current bin construction increases the time and cost of onsite assembly.

Therefore, a primary objective of the present invention is the provision of an improved bulk storage bin or silo for storage of particulate material.

A further objective of the present invention is the provision of a particulate material storage bin formed from bolt-together panels having a smooth interior surface.

Another objective of the present invention is the provision of a bulk storage silo having a modular, expandable design which can be quickly and easily shipped and can be assembled on-site in a minimal amount of time.

Yet another objective of the present invention is the provision of a bolt together silo, wherein the bolts all reside on the exterior of the silo, without extending into the silo.

A further objective of the present invention is the provision of a bolt together silo which eliminates the need to have a person inside the silo during assembly of the silo wall segments.

Another objective of the present invention is the provision a silo with a continuous compression ring to accommodate storage of heavier bulk products in the silo.

A further objective of the present invention is the provision a bolt together silo which is economical to manufacture, quick and easy to assemble onsite and durable in use.

These and other objectives will become apparent from the following description of the invention.

SUMMARY OF THE INVENTION

The bulk storage silo of the present invention includes a cylindrical sidewall, a top wall, and a bottom wall. The bottom wall is formed by a plurality of sections or segments to create a funnel-shaped hopper, with an outlet opening at the center for discharge of material from the silo. Each hopper section includes opposite sides with an external flange extending from bottom to top for bolting the adjacent hopper sections together. A compression ring extends 360° around the silo at the top of the hopper bottom wall. The connecting flanges extend behind or inside the compression ring. Access holes are provided in the compression ring to allow access to the interior flange holes to install the nut and bolt connectors. None of the bolts extend through the hopper bottom segments into the silo such that the silo hopper bottom has a smooth interior surface. Also, the exterior assembly of the hopper bottom flanges eliminates the need for a person inside the silo during assembly.

DETAILED DESCRIPTION

Figure 1:
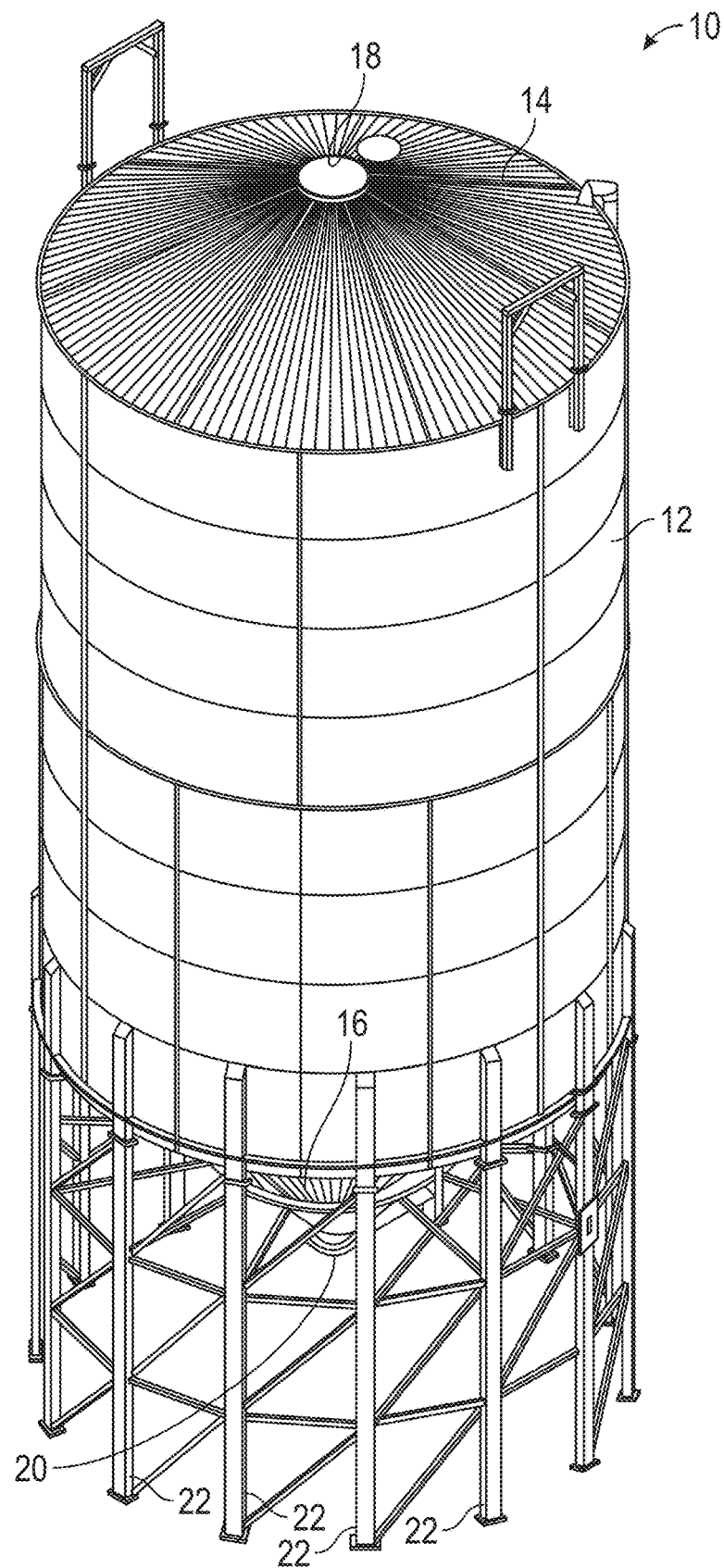
FIG. 1 is a perspective view of a bulk storage silo or bin according to the present invention.
Figure 2:
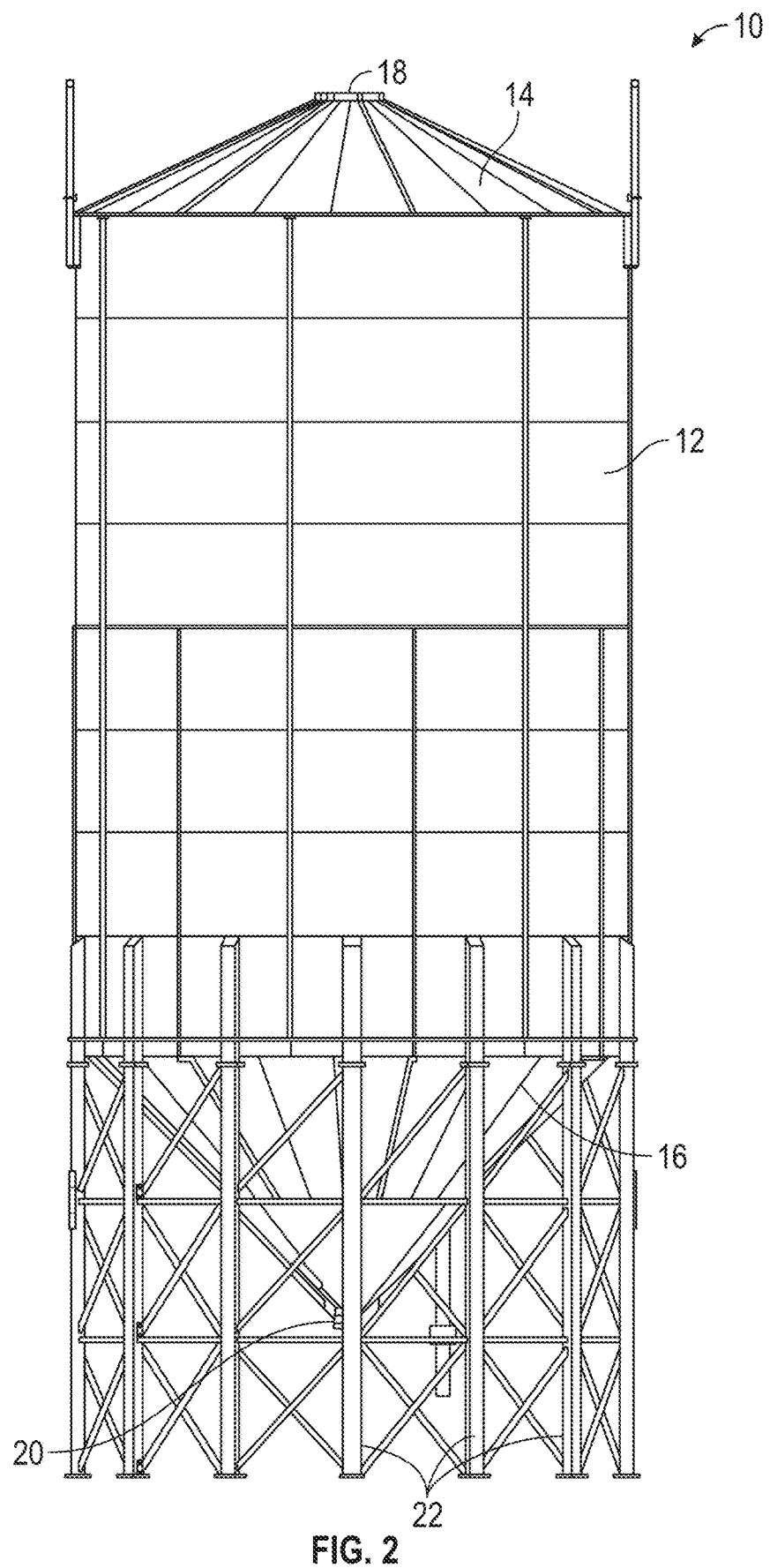
FIG. 2 is a front elevation view of the silo or bin.

A bin or silo for storage of grain and other particulate material is generally designated in FIGS. 1 and 2 by the reference numeral 10. The silo or bin 10 includes a cylindrical sidewall 12, a top wall or roof 14, and a sloped, funnel-shaped bottom wall or hopper 16. The roof 14 includes an inlet opening with a cover 18. The hopper 16 includes an outlet opening 20 with a gate (not shown) to allow discharge of material from the silo or bin 10. A plurality of legs 22 support the silo or bin 10 above the ground. The silo or bin 10 can be used for storage of various bulk products. The sidewall 12, roof 14, and hopper 16 are all modular to allow for shipping and onsite assembly.

Figure 3:
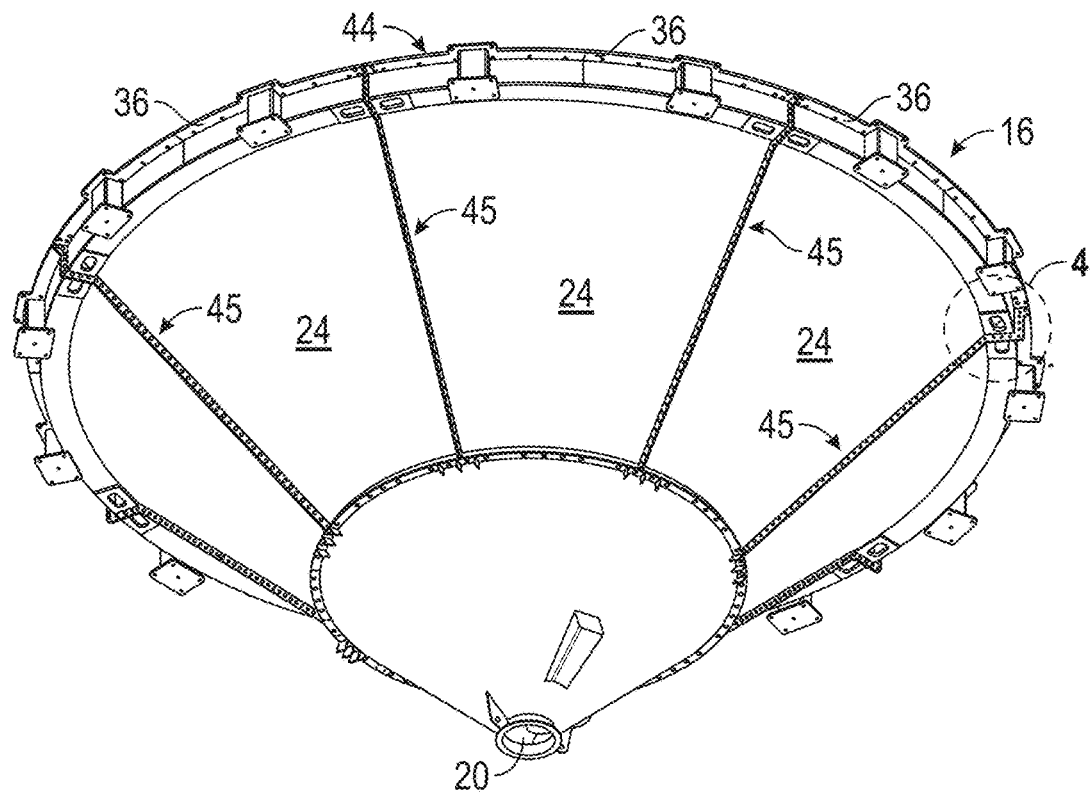
FIG. 3 is a bottom perspective view of the hopper of the bin, with the compression ring according to the present invention.
Figure 4:
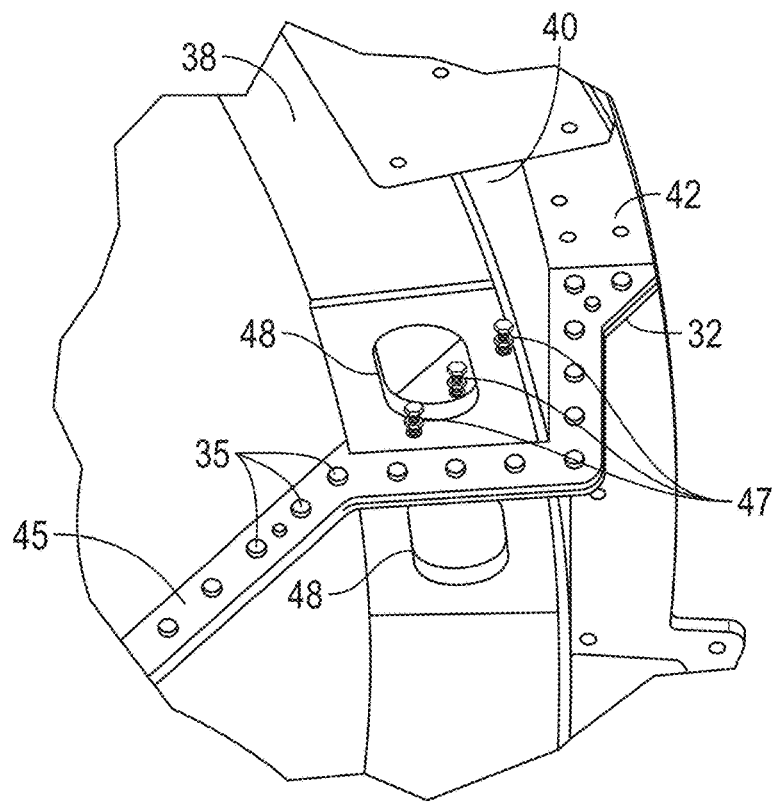
FIG. 4 is an enlarged view taken along lines 4-4 of FIG. 3.
Figure 5:
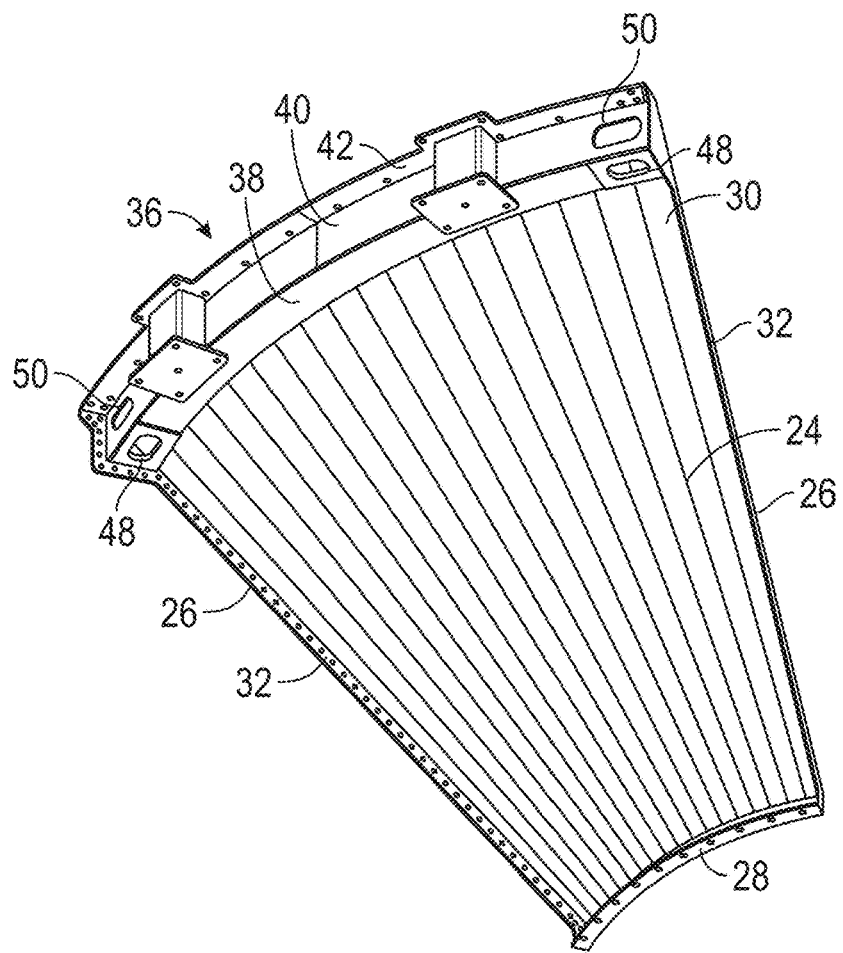
FIG. 5 is a perspective view of one hopper section.

As shown in FIGS. 3 and 5, the hopper 16 is formed by a plurality of segments or sections 24. The segments 24 generally have a trapezoidal shape with a curved radius so as to form the funnel-shaped hopper 16 when the segments are assembled. Each segment 24 has opposite side edges 26, a bottom edge 28 and a top edge 30. An outwardly extending flange 32 extends along each side edge 26 from the bottom edge 28 to the top edge 30. Each flange 32 includes a plurality of holes 34 to receive bolts 35 for assembling adjacent segments 24.

Figure 6:
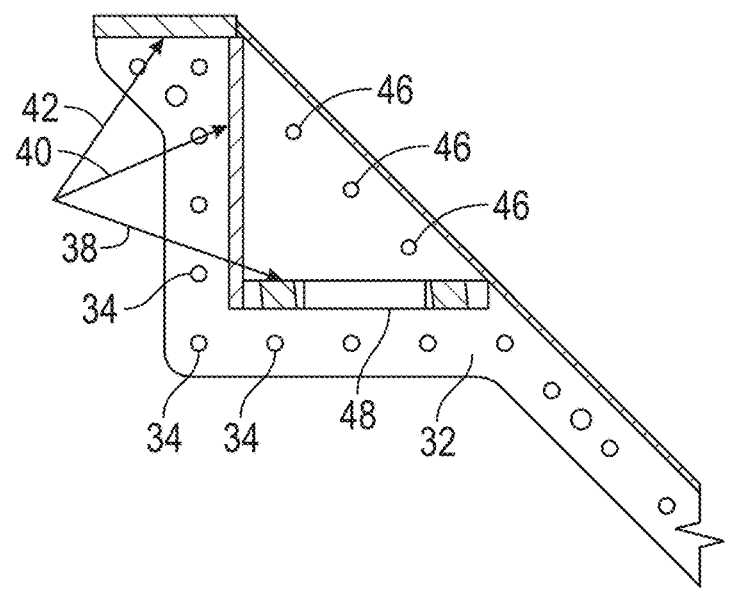
FIG. 6 is an enlarged sectional view through the compression ring showing the access hole to provide access to the interior flange bolt holes.

A plate assembly 36 is welded along the top edge 30 of each bottom segment 24. The plate assembly 36 preferably comprises a first plate 38 extending horizontally outwardly from the bottom segment 24, a second plate 40 extending vertically upwardly from the first plate 28 to the top edge of the bottom segment 24, and a third plate 42 extending horizontally outwardly from the second plate, as best seen in FIG. 6. The plates 38, 40, 42 are welded together. When the bottom segments 24 are assembled, the plate assemblies 36 form a compression ring 44 extending continuously around the circumference of the bin 10 adjacent the joint between the hopper 16 and the side wall 14.

As shown in FIG. 6, a portion of the connecting flange 32 resides inside or behind the first and second plates 38, 40. This interior portion of the flange includes holes 46. An enlarged hole or opening 48 is provided at each end of the plate 38 so as to provide access to the interior bolt holes 46, thereby allowing an assembler to insert bolts 47 through the holes 46 and to tighten a nut on the bolts. As an alternative to the access holes 46, an enlarged hole or opening 48 can be provided at each end of the second plate 40 so as to provide access to the interior bolt holes 50.

The compression ring 44 may be apart of an overall weldment that includes the hopper segments 24. Alternatively, the compression ring 44 may be its own weldment, and the hopper segments 24 can be attached to the compression ring with another external bolt flange.

The compression ring and flange assembly provides a system for connection continuity in a bolt together silo or bin which avoids any bolts protruding into the interior of the silo or bin 10. The flanged joints 45 on each side edge of the hopper segments 24 eliminate the need for anyone to be inside the bin assembly. The compression ring 44 and flanged joints 45 also preclude separation of the bottom segments 24 due to hoop tension caused by excessive product loads. The compression ring 44 and flange joints 45 also avoid discontinuity and keeps a continuous closed shape for enhanced structural capacity, while minimizing or eliminating any adverse effects from transferring shear flow and bending stresses. Preferably, the access holes 46, 48 may be covered by a cap (not shown). Also, the access holes 46, 48 may be reinforced, such as with a steel ring.

The plate assembly 36 and flanges 32 allow for a simple modular design for shipping and for quick and easy onsite labor assembly. The modular design also allows the bin or silo 10 to be expandable by adding additional segments to the walls, or by increasing the segment or panel size. The compression ring 44 and flanged joints 45 also permit heavier weight bulk storage of grain and other particulate material.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A bulk storage bin having a funnel bottom with an outlet, the bottom being formed by a plurality of trapezoidal panels each having upper and lower edges and opposite side edges, the bin comprising:
   plate assemblies fixed to each panel and extending along the upper edge and from one of the sides edges to the other side edge;
   flanges extending along the opposite side edges and from the upper edge to the lower edge on each panel and on the exterior of each panel;
   each flange having exterior and interior holes for receiving bolts, with the interior holes being between the plate assemblies and the panels; and
   access holes in the plate assemblies to provide access to bolts extending through the interior holes of the flanges.

2. The bulk storage bin of claim 1 wherein the bolts reside fully on the exterior of the panels.

3. The bulk storage bin of claim 1 wherein each plate assembly includes a lower horizontal plate and a vertical plate.

4. The bulk storage bin of claim 3 wherein the access hole is in the lower horizontal plate.

5. The bulk storage bin of claim 3 wherein the access hole is in the vertical plate.

6. The bulk storage bin of claim 3 wherein each plate assembly further comprises an upper horizontal plate.

7. The bulk storage bin of claim 6 wherein the vertical plate extends between the upper and lower horizontal plates.

8. The bulk storage bin of claim 1 wherein the plate assemblies extend 360° when the panels are assembled to form the funnel bottom of the bin.

9. The bulk storage bin of claim 1 wherein the plate assemblies are welded to the panels.

10. The bulk storage bin of claim 1 wherein the flanges do not extend into the bin.

11. A silo for storage of particulate material, the silo having a cylindrical side wall, a roof with an inlet opening, and a sloped lower hopper formed by a plurality of connected panels; and a discharge opening, the improvement comprising:
    a ring extending around the silo adjacent a juncture of the side wall and the hopper;
    a flange extending radially outwardly on opposite edges of each panel, with adjacent pairs of the flanges extending in an orthogonal direction from the panels; and
    bolts extending through the pairs of flanges in a direction tangential to the panels.

12. The silo of claim 11 wherein some of the bolts are inside the ring.

13. The silo of claim 12 wherein the ring has openings therein to provide access to the bolts inside the ring.

14. The silo of claim 13 wherein the ring includes a lower horizontal plate and a vertical plate.

15. The silo of claim 14 wherein the openings are in the horizontal plate.

16. The silo of claim 14 wherein the openings are in the vertical plate.

17. The silo of claim 11 wherein the flange has interior and exterior bolt holes, with the interior bolt holes being inside the ring.

18. The silo of claim 11 wherein the ring has openings to provide access to the interior bolt holes.

19. The silo of claim 11 wherein the ring and flanges are welded to the panels.

20. The silo of claim 11 wherein the ring is formed by plates on an upper edge of each panel.

* * * * *